(12) United States Patent
Iwasaki et al.

(10) Patent No.: US 8,636,520 B2
(45) Date of Patent: Jan. 28, 2014

(54) MOLD FOR PRODUCING SIMULATED BLOOD VESSEL, METHOD OF PRODUCING SIMULATED BLOOD VESSEL AND SIMULATED BLOOD VESSEL

(75) Inventors: Kiyotaka Iwasaki, Tokyo (JP); Mitsuo Umezu, Tokyo (JP); Takashi Tanaka, Tokyo (JP)

(73) Assignee: Waseda University, Tokyo (JP)

( * ) Notice: Subject to any disclaimer, the term of this patent is extended or adjusted under 35 U.S.C. 154(b) by 360 days.

(21) Appl. No.: 13/003,922

(22) PCT Filed: Jan. 28, 2009

(86) PCT No.: PCT/JP2009/051309
§ 371 (c)(1),
(2), (4) Date: Jan. 13, 2011

(87) PCT Pub. No.: WO2010/007801
PCT Pub. Date: Jan. 21, 2010

(65) Prior Publication Data
US 2011/0117531 A1    May 19, 2011

(30) Foreign Application Priority Data

Jul. 16, 2008  (JP) .................................. 2008-184614

(51) Int. Cl.
*G09B 23/28*       (2006.01)
(52) U.S. Cl.
USPC ........................................................ 434/272
(58) Field of Classification Search
USPC .................. 434/81, 82, 262, 267, 268, 272
See application file for complete search history.

(56) References Cited

U.S. PATENT DOCUMENTS 4,198,766 A * 4/1980 Camin .......................... 434/272
(Continued)

FOREIGN PATENT DOCUMENTS

| JP | 3236787 B2 | 12/2001 |
|----|-----------|---------|
| JP | 2004-275682 A | 10/2004 |

(Continued)

OTHER PUBLICATIONS

International Search Report of PCT/JP2009/051309, mailing date Mar. 10, 2009.

*Primary Examiner* — Kurt Fernstrom
(74) *Attorney, Agent, or Firm* — Westerman, Hattori, Daniels & Adrian, LLP

(57) ABSTRACT

Disclosed is a method whereby a narrowed part similar to an actual lesioned blood vessel can be easily obtained. A mold (10) comprises first and second molded members (16, 17) having inner spaces (29, 40, 57) passing through in the axial direction and an axial member (18) detachably inserted through the individual inner spaces (29, 40, 57) of the individual molded members (16, 17). The molded members (16, 17) have tapered front parts (27, 27) respectively. In the state of facing the front ends (20) of the tapered front parts (27) to each other and thus forming a concave (12), the axial member (18) is attached. A first material (75) made of a mixed material comprising calcium carbonate or the like and silicone or the like is applied to the concave (12). A second material (76) such as silicone is applied to the entire outer periphery of the mold (10). After hardening the materials (75, 76), the mold (10) is withdrawn by detaching the axial member (18) and dividing the concave (12). Thus, a simulated blood vessel (78) having a simulated narrowed part of the blood vessel caused by calcification can be obtained.

8 Claims, 4 Drawing Sheets

(56) References Cited

U.S. PATENT DOCUMENTS

| | | | |
|---|---|---|---|
| 6,511,325 B1 * | 1/2003 | Lalka et al. | 434/272 |
| 6,997,719 B2 * | 2/2006 | Wellman et al. | 434/272 |
| 7,008,232 B2 * | 3/2006 | Brassel | 434/268 |
| 7,255,565 B2 * | 8/2007 | Keegan | 434/272 |
| 2005/0016548 A1 | 1/2005 | Brassel | |
| 2007/0282202 A1 | 12/2007 | Maurice et al. | |
| 2008/0136059 A1 * | 6/2008 | Yoshino et al. | 264/299 |
| 2012/0040323 A1 * | 2/2012 | Park et al. | 434/272 |

FOREIGN PATENT DOCUMENTS

| | | |
|---|---|---|
| JP | 2005-504350 A | 2/2005 |
| JP | 2006-201291 A | 8/2006 |
| JP | 2007-206379 A | 8/2007 |
| JP | 2007-521891 A | 8/2007 |
| JP | 2008-020655 A | 1/2008 |

* cited by examiner

FIG.3
(A)
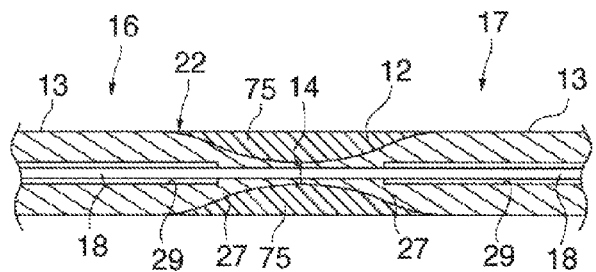
(B)
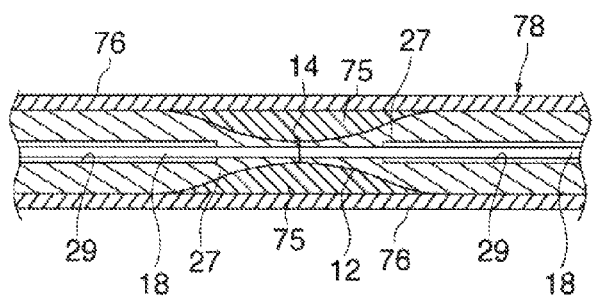
(C)
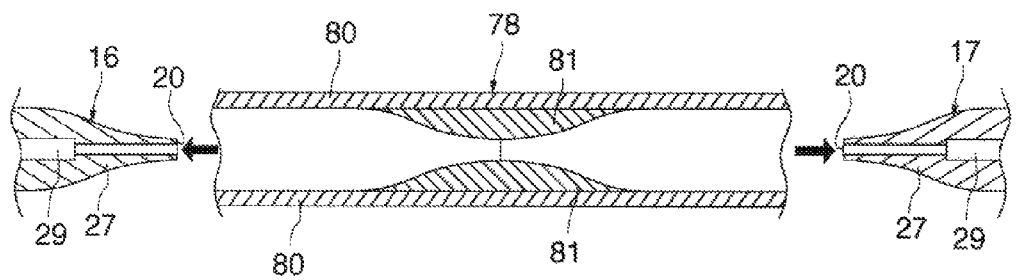

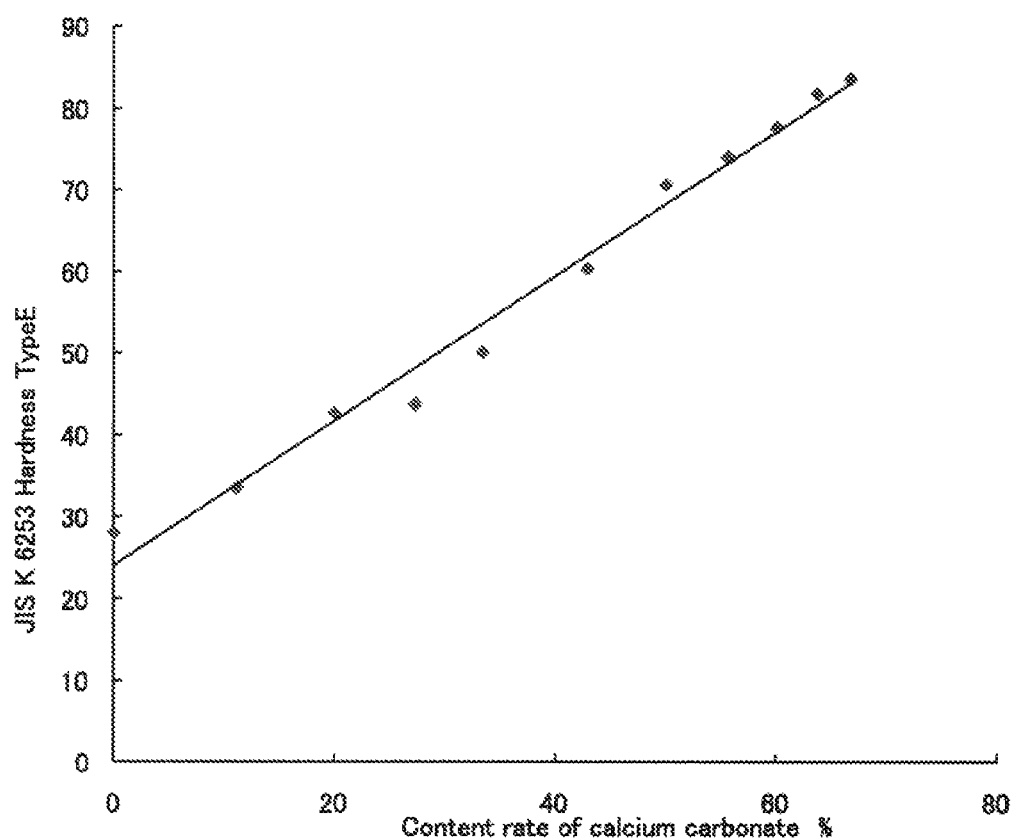

MOLD FOR PRODUCING SIMULATED BLOOD VESSEL, METHOD OF PRODUCING SIMULATED BLOOD VESSEL AND SIMULATED BLOOD VESSEL

TECHNICAL FIELD

The present invention relates to a mold for producing a simulated blood vessel, a method of producing a simulated blood vessel and a simulated blood vessel, and more particularly, to a simulated blood vessel and a method of producing a simulated blood vessel and a mold used for producing a simulated blood vessel suitable for a performance test of a stent, training of cardiac surgery such as coronary artery bypass surgery and manipulation evaluation.

BACKGROUND ART

When a blood vessel is narrowed through plaque formation whereby fat is deposited or calcification or the like, the lumen of the blood vessel is expanded using a medical instrument called "stent" to secure blood circulation. For this stent, as other medical instruments, it is extremely important to evaluate the validity and safety thereof through an animal experiment or using an extracorporeal apparatus simulating a patient's lesion before applying it to the patient. However, there is no technique for creating any lesioned animal whose blood vessel is narrowed through calcification, and if such a technique exist, it may be extremely difficult to create an animal having such a lesioned blood vessel with a high degree of reproducibility. Furthermore, as a technique of creating a blood vessel model having a narrowed part, a method of producing a simulated blood vessel is disclosed in Patent Document 1. This producing method uses a core whose center part has a smaller diameter than other parts, fills a mold in which the core is accommodated with an aqueous solution of polyvinyl alcohol, casts the mold, repeats freezing and unfreezing, and then breaks and extracts the center part of the core, and can thereby create a simulated blood vessel made of polyvinyl alcohol hydrogel. Here, when injecting polyvinyl alcohol into the mold in order to form an adipose equivalent narrowed part, another aqueous solution of polyvinyl alcohol with lowered alcohol concentration is injected through a hole of the center part of the mold.

Patent Document 1: Japanese Patent Laid-Open No. 2004-275682

DISCLOSURE OF THE INVENTION

Problems to be Solved by the Invention

However, according to the producing method of Patent Document 1, the center part of the core needs to be broken after molding, which prevents the core from being used repeatedly, and producing one simulated blood vessel requires a new core to be provided, resulting in a problem of low cost performance. Furthermore, since the core needs to be broken after molding, it must be made of a material that can be easily broken, which constitutes a factor that causes the core to be suddenly damaged before demolding, resulting in a problem that the simulated blood vessel cannot be stably mass-produced. Furthermore, according to the above described producing method, the adipose equivalent narrowed part and other parts are formed with aqueous solutions of polyvinyl alcohol of different concentrations and both are formed of polyvinyl alcohol, and therefore the aqueous solution of polyvinyl alcohol injected when creating the adipose equivalent portion is mixed with the surrounding aqueous solution of polyvinyl alcohol and the adipose equivalent portion may also be formed in non-lesioned regions other than the narrowed part. For this reason, in order for only the desired region to be used as the adipose equivalent portion, the amount of aqueous solution of polyvinyl alcohol of low alcohol concentration injected and the pressure of injection need to be finely adjusted, which results in a problem of complicating the production. Furthermore, it is not possible to form a simulated blood vessel having a calcified narrowed part using the above described producing method.

The present invention has been devised in view of such problems and it is an object of the present invention to provide a mold for producing a simulated blood vessel, a method of producing a simulated blood vessel and a simulated blood vessel capable of easily obtaining a narrowed part similar to an actual lesioned blood vessel.

Means for Solving the Problems (1) In order to attain the above described object, the present invention is a bar-shaped mold used to produce a simulated blood vessel adopting a configuration including a concave recessed in a diameter direction with respect to a neighboring region, wherein the concave is divisible in an axial direction at a minimum diameter portion.

(2) Furthermore, the present invention is a bar-shaped mold used to produce a simulated blood vessel adopting a configuration including a straight part whose outside diameter is substantially constant and a concave connected to the straight part and having a smaller outside diameter than the straight part, wherein the concave has a shape whose diameter gradually decreases from both ends in an axial direction toward a center part and is divisible in the axial direction at the center part.

(3) Furthermore, the present invention is a bar-shaped mold used to produce a simulated blood vessel adopting a configuration including first and second molded members in which inner spaces penetrating in an axial direction are formed respectively and axial members detachably attached to the respective molded members by being inserted into the respective inner spaces, wherein the first and second molded members are each provided with a narrowed tapered front part, the axial members are attached with front ends of the tapered front parts confronting each other to form a concave and the respective molded members can be separated when the axial members are removed.

(4) Here, the first and/or second molded members may be provided so as to be divisible into a plurality of portions in the axial direction and shaped so that each divided portion can be coupled with any one of the other divided portions.

(5) A method of producing a simulated blood vessel according to the present invention adopts a technique of causing a first material to adhere to the concave, then causing a second material to adhere to the entire outer periphery of the mold, dividing the concave after each material is hardened, pulling both ends in the axial direction of the mold to thereby withdraw the mold from each material and obtaining a simulated blood vessel.

(6) Here, the first material is an inorganic material of any one of calcium phosphate, calcium carbonate, magnesium and sodium, a high polymer material of any one of silicone, latex and polyurethane or a mixed material of the inorganic material and the high polymer material and the second material is a high polymer material of any one of silicone, latex and polyurethane, and it is possible to adopt a technique of forming a narrowed part of a blood vessel in a simulated manner through calcification.

(7) Particularly, it is preferable to adopt a technique of forming narrowed parts of different levels of hardness for the first material in a simulated manner by adjusting the composition between the inorganic material and the high polymer material.

(8) Furthermore, it is possible to adopt a technique of causing a high polymer material of any one of silicone, latex and polyurethane to adhere to the concave and then causing the first material to adhere thereto.

(9) Furthermore, the first material is a liquid or jellied material and the second material is a high polymer material of any one of silicone, latex and polyurethane, and it is possible to adopt a technique of forming a narrowed part of a blood vessel due to plaque in a simulated manner.

(10) Furthermore, it is possible to adopt a technique of forming a gap in the divided part of the concave, causing the first material to adhere thereto, and heating and hardening the first material.

(11) Furthermore, the present invention is a simulated blood vessel adopting a configuration including a simulated non-lesioned part simulating a non-lesioned part of a blood vessel and provided within a substantially constant diameter and a simulated narrowed part neighboring the simulated non-lesioned part simulating the narrowed part of the blood vessel and having a smaller inner diameter than the simulated non-lesioned part, wherein the simulated narrowed part is formed of an inorganic material of any one of calcium phosphate, calcium carbonate, magnesium and sodium, a high polymer material of any one of silicone, latex and polyurethane or a mixed material of the inorganic material and the high polymer material.

Advantages of the Invention

According to the configurations in (1) to (3), since the concave can be divided at the part of a minimum diameter, when the material of the simulated blood vessel is made to adhere to the entire outer periphery of the mold and the concave is divided after the material is hardened, it is possible to withdraw the mold from both ends in the axial direction of the simulated blood vessel obtained through hardening of the material. In the simulated blood vessel obtained in this way, the inner wall swollen portion formed of the concave corresponds to the narrowed part of the blood vessel and it is possible to simulate the shape of the narrowed part of various pathosis in the actual blood vessel and simulate and form various types of lesioned blood vessel by changing the shape of the concave. Furthermore, when a new simulated blood vessel is formed, the same mold can be repeatedly used by recoupling once divided concaves and the simulated blood vessel of the same shape can be mass-produced at a low cost. Furthermore, since the mold of the present invention need not be destroyed when withdrawn from the material, the mold can be formed of a metal material of a high level of strength and the mold is not destroyed unnecessarily in the process of hardening of the material and the simulated blood vessel can always be stably formed.

With the configuration as shown in (4), the length of the entire mold can be adjusted by increasing or decreasing the number of divided parts and it is possible to form simulated blood vessels of different lengths from one mold. Furthermore, by providing a plurality of types of only the divided parts to obtain concaves of different shapes and selecting the divided parts as appropriate, it is possible to form narrowed parts of different shapes while achieving commonality among other divided portions and obtain a simulated blood vessel that simulates the shape of more narrowed parts with a minimum number of parts of the mold.

According to the technique in (5), a simulated blood vessel having a narrowed part can be formed without destroying the mold and a simulated blood vessel similar to an actual lesioned blood vessel in which a narrowed part is formed can be obtained easily and with high cost performance.

According to the technique in (6), an actual lesioned blood vessel in which a calcified narrowed part is formed can be easily formed in a simulated manner.

According to the technique in (7), simulated narrowed parts varying in hardness can be easily created according to actual pathosis and various narrowed parts can be simulated based on various pathosis.

According to the technique in (8), a lesioned blood vessel having a narrowed part which has been embrittled through calcification can be simulated.

According to the technique in (9), an actual lesioned blood vessel in which plaque-formed narrowed part is formed can be easily simulated.

According to the technique in (10), air in the gap enters the first material in the process of hardening of the first material and a mark made up of bubbles can be formed in the first material. The mark is formed in an outer periphery of the simulated blood vessel in the vicinity of the most narrowed region of the simulated narrowed part and when a performance evaluation test or the like of a stent is conducted, a target position where the stent is left indwelling can be determined based on the mark.

According to the configuration in (11), a simulated blood vessel similar in hardness to the actual lesioned blood vessel having a calcified narrowed part can be formed using a simple procedure.

BRIEF DESCRIPTION OF THE DRAWINGS

FIGS. 3(A) to (C) are schematic views illustrating a procedure for producing a simulated blood vessel; and FIG. 4 is a graph illustrating a relationship between a content rate of calcium carbonate and hardness of the narrowed part.

BEST MODE FOR CARRYING OUT THE INVENTION

Hereinafter, an embodiment of the present invention will be described with reference to the accompanying drawings.

Figure 1:
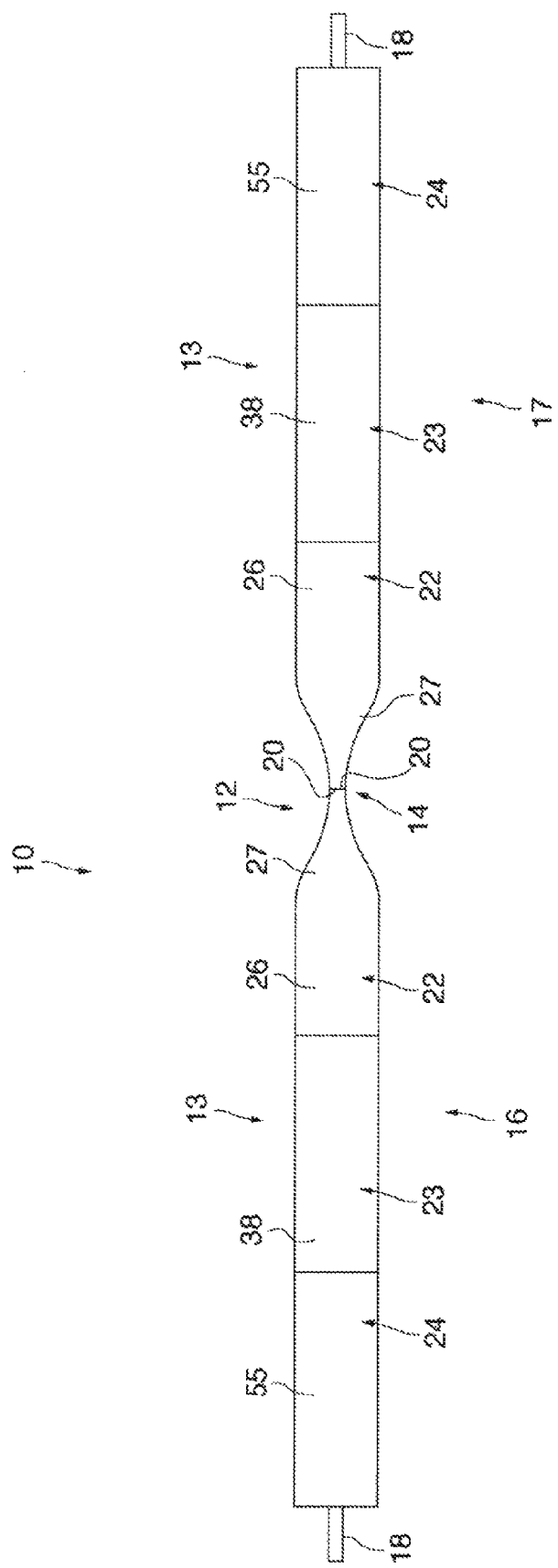
FIG. 1 is a schematic plan view of a mold according to the present embodiment.

FIG. 1 shows a schematic plan view of a mold according to the present embodiment. In this figure, a mold 10 is shaped like a round bar made of stainless steel with a concave 12 formed substantially in the center in the left-to-right direction and is made divisible in an axial direction at a center part 14 substantially in the center in the left-to-right direction of the concave 12. The mold 10 is configured by including a first molded member 16 located on the left side of the center part 14 in the FIG. 1, a second molded member 17 located on the right side of the center part 14 in the figure and a round bar-shaped axial member 18 that penetrates the interior of the first and second molded members 16 and 17.

The first and second molded members 16 and 17 have substantially the same shape, are arranged to be symmetric to each other in an operating condition in FIG. 1 and front ends 20 having the minimum outside diameter confront each other. Hereinafter, the configuration and structure of the first molded member 16 will be described in detail and components of the second molded member 17 identical or equivalent to the components of the first molded member 16 will be assigned the same reference numerals and descriptions thereof will be omitted.

The first molded member 16 is made divisible into three portions in the axial direction and is made up of a front end member 22 including the front end 20, an intermediate member 23 detachably coupled on the left end side of the front end member 22 in FIG. 1 and a rear end member 24 detachably coupled on the left end side of the intermediate member 23 in the figure.

Figure 2:
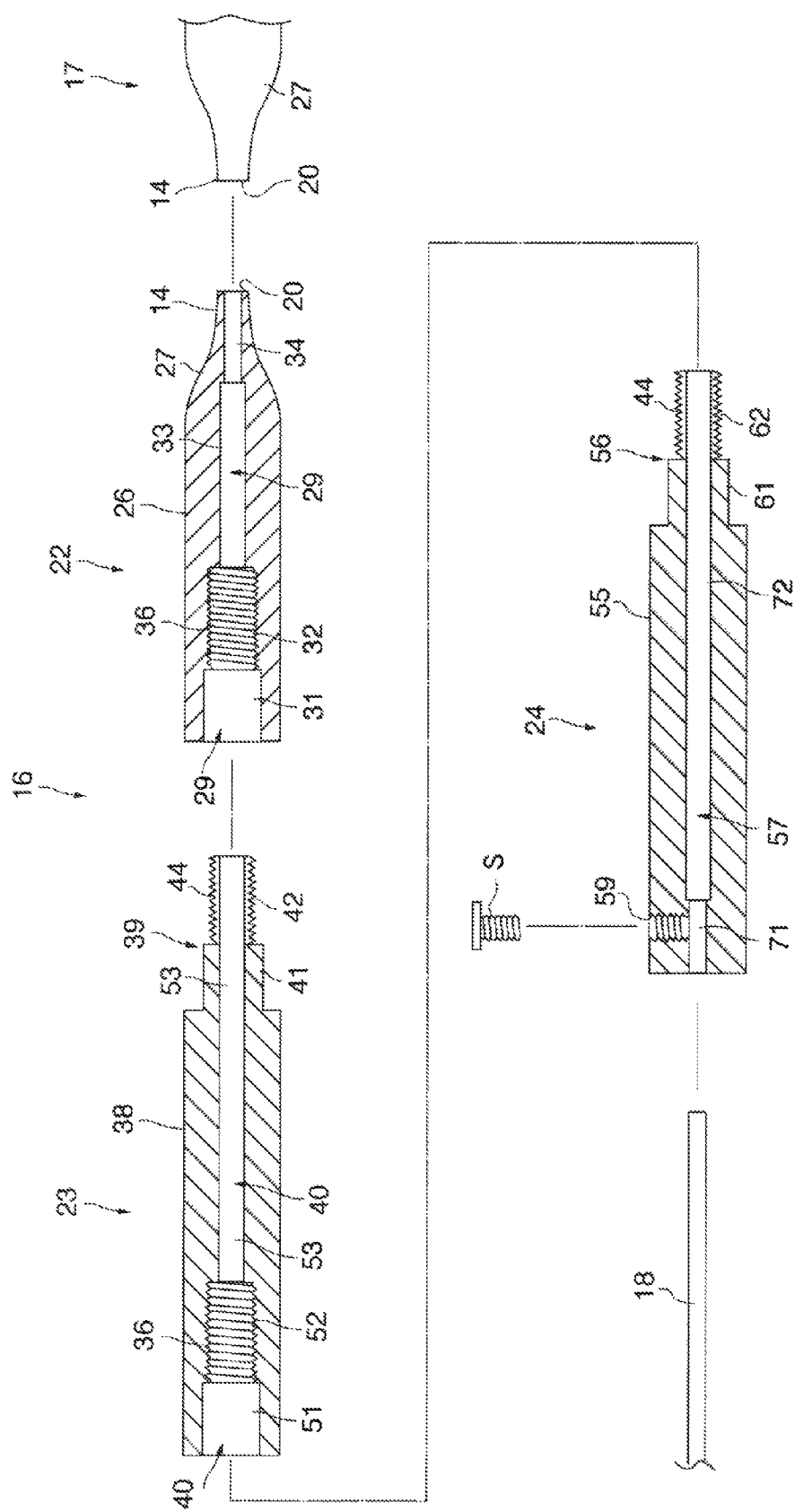
FIG. 2 is a schematic exploded cross-sectional view of a first molded member.

As shown in FIG. 2, the front end member 22 is provided with a rectilinear section 26 whose outside diameter is substantially constant, a tapered front part 27 connected to the rectilinear section 26, whose outside diameter gradually becomes smaller toward the front end 20 and an inner space 29 that extends in the axial direction which is the left-to-right direction in the rectilinear section 26 and the tapered front part 27.

The inner space 29 is open on both the left and right end sides in FIG. 2 and formed so that the inner diameter gradually becomes smaller from the left side in the figure. That is, the inner space 29 is made up of a first spatial region 31 which is open on the left end side in the figure and whose inner diameter is set to be largest, a second spatial region 32 communicating with the first spatial region 31 and whose inner diameter is set to be smaller than the first spatial region 31, a third spatial region 33 communicating with the second spatial region 32 and whose inner diameter is set to be smaller than the second spatial region 32 and a fourth spatial region 34 communicating with the third spatial region 33 and whose inner diameter is set to be smaller than the third spatial region 33 and which is open on the front end 20 side. Here, a screw groove 36 is formed in the inner surface of the second spatial region 32. The inner diameter of the fourth spatial region 34 is substantially the same as the outside diameter of the axial member 18.

The intermediate member 23 is provided with a rectilinear section 38 provided to have the same outside diameter as that of the rectilinear section 26 of the front end member 22 and extending rectilinearly, a coupling section 39 connected to the right side of the rectilinear section 38 in FIG. 2 and inserted into the inner space 29 from the rear end side which is the left end side of the front end member 22 in the figure, and an inner space 40 that extends in the axial direction in the rectilinear section 38 and the coupling section 39.

The coupling section 39 is fitted into the first and second spatial regions 31 and 32 of the front end member 22, and formed into a stepped bar shape in such a size that substantially the entire region thereof can be accommodated into the spatial regions 31 and 32. This coupling section 39 is made up of a first protruding region 41 connected to the rectilinear section 38 and a second protruding region 42 connected to the first protruding region 41 and whose outside diameter is smaller than that of the first protruding region 41. A screw groove 44 engaging with the screw groove 36 of the second spatial region 32 of the front end member 22 is formed on the outer periphery of the second protruding region 42 and the front end member 22 and the intermediate member 23 are coupled in a manner non-droppable from each other by screwing the second protruding region 42 into the second spatial region 32.

The inner space 40 is open on both the left and right end sides in FIG. 2, and is formed so that the inner diameter gradually becomes smaller from the left side in the figure. The inner space 40 is made up of a first spatial region 51 open on the left end side in the figure and whose inner diameter is set to be largest, a second spatial region 52 communicating with the first spatial region 51 and whose inner diameter is set to be smaller than that of the first spatial region 51, and a third spatial region 53 communicating with the second spatial region 52, whose inner diameter is set to be smaller than that of the second spatial region 52 and which is open on the right end side in FIG. 2. Here, the first and second spatial regions 51 and 52 have configurations, shapes and sizes substantially identical to those of the first and second spatial regions 31 and 32 of the front end member 22, and the screw groove 36 is formed in the inner surface in the second spatial region 52 here in the same way as in the second spatial region 32 of the front end member 22. Furthermore, though not particularly limited, the inner diameter of the third spatial region 53 is substantially identical to that of the third spatial region 33 of the front end member 22.

The rear end member 24 is provided with a rectilinear section 55 provided so as to have the same outside diameter as that of the rectilinear sections 26 and 38 and extending rectilinearly, a coupling section 56 connected to the right side of the rectilinear section 55 shown in FIG. 2 and inserted from the left end side of the intermediate member 23 in the figure into an inner space 40, and an inner space 57 that extends in the axial direction in the rectilinear section 55 and the coupling section 56.

One screw hole 59 opening on the outer periphery on the rear end side which is the left end side in FIG. 2 and penetrating toward the inner space 57 is formed in the rectilinear section 55.

The coupling section 56 is fitted into the first and second spatial regions 51 and 52 of the intermediate member 23 and formed into a stepped bar in such a size that substantially the entire region can be accommodated in the spatial regions 51 and 52. The coupling section 56 has a configuration, shape and size substantially identical to those of the coupling section 39 of the intermediate member 23 and is made up of a first protruding region 61 connected to the rectilinear section 55 and a second protruding region 62 connected to the first protruding region 61, whose outside diameter is set to be smaller than that of the first protruding region 61 with a screw groove 44 formed on the outer periphery. Therefore, by screwing the second protruding region 62 into the second spatial region 52 of the intermediate member 23, the intermediate member 23 and the rear end member 24 are coupled in a manner non-droppable from each other.

The inner space 57 is open on both left and right sides in FIG. 2 and the inner diameter is formed into a shape of a stepped hole whose inner diameter partially varies. The inner space 57 is made up of a first spatial region 71 open on the left side in FIG. 2 and a second spatial region 72 communicating with the first spatial region 71 and whose inner diameter is set to be larger than that of the first spatial region 71. The first spatial region 71 has an inner diameter substantially identical to the outside diameter of the axial member 18 and the screw hole 59 communicates therewith. Although the second spatial region 72 is not particularly limited, the second spatial region 72 has an inner diameter substantially identical to those of the third spatial regions 33 and 53 of the front end member 22 and the intermediate member 23.

The axial member 18 has a length greater than the total length of the first and second molded members 16 and 17.

Next, the procedure for uniting the mold 10 configured as shown above and the method of producing a simulated blood vessel using the mold 10 will be described.

First, by screwing the coupling sections 39 and 56 of the intermediate member 23 and the rear end member 24 into the inner spaces 29 and 40 of the front end member 22 and the intermediate member 23, the front end member 22, intermediate member 23 and rear end member 24 are coupled to obtain the first and second molded members 16 and 17 in which these members 22 to 24 are united. The front ends 20 and 20 of the molded members 16 and 17 are placed so as to face each other, made to exactly match each other and the axial member 18 is inserted into the inner spaces 29, 40 and 57 of the molded members 16 and 17. Furthermore, screws S are inserted into screw holes 59, 59 provided in the rear end members 24, 24 of the first and second molded members 16 and 17 and the axial member 18 is pressed at the front end of the screw S. In this case, since the first spatial region 71 communicating with the screw hole 59 has an inner diameter substantially identical to the outside diameter of the axial member 18, the axial member 18 is tightly fitted thereinto and the axial member 18 is strongly pressed at the front end of the screw S. That is, in such an attachment condition, the movement and rotation of the first and second molded members 16 and 17 with respect to the axial member 18 are blocked, the separation or approach between the molded members 16 and 17 are regulated, the aforementioned confrontation is maintained, the relative rotation between the molded members 16 and 17 is regulated and twisting of the mold 10 during the production of the simulated blood vessel is regulated.

In the mold 10 set as described above, the front ends 20 and 20 of the tapered front parts 27 and 27 of the first and second molded members 16 and 17 are made to confront each other, the concave 12 which is curved so that the diameter thereof gradually becomes smaller toward the center part 14 is formed and the portions on both the left and right sides of the concave 12 become the straight part 13 whose outside diameter is substantially constant.

As shown in FIG. 3(A), the first material 75 which is an inorganic material of any one of calcium phosphate, calcium carbonate, magnesium and sodium, a high polymer material of any one of silicone, latex and polyurethane or a mixed material of the inorganic material and the high polymer material is applied to the concave 12 and the concave 12 is filled with the first material 75 so that the outer circumferential portion of the concave 12 has an outside diameter approximate to the straight part 13. The mold 10 in which the first material 75 adheres to the concave 12 is introduced into an oven at approximately 80° C., left standing for approximately one hour and the first material 75 is thereby hardened. Next, as shown in FIG. 3(B), a second material 76 made of a high polymer material of any one of silicone, latex and polyurethane is applied to the outer periphery of the entire mold 10 to a desired thickness of the blood vessel. That is, the second material 76 is thoroughly made to adhere to the outer periphery of the straight part 13 which is closer to the front end side than the position where the screw S (see FIG. 2) is attached and the outer surface of the first material 75 with which the concave 12 is filled here. The whole mold 10 is introduced into the oven at approximately 80° C., left standing for approximately one hour and the second material 76 is hardened and a simulated blood vessel 78 is formed on the outer periphery side of the mold 10. The screw S is then removed from the mold 10 and the axial member 18 is withdrawn from the rear end side of any one of the first and second molded members 16 and 17. In this case, the tapered front parts 27 and 27 of the first and second molded members 16 and 17 confront each other, but since these tapered front parts 27 and 27 are not directly coupled, when the axial member 18 is withdrawn, the tapered front parts 27 and 27 become separable from each other, and the first and second molded members 16 and 17 are withdrawn from the simulated blood vessel 78 by pulling the respective rear end sides in the axial direction as shown in FIG. 3(C). Here, since the mold 10 is formed of stainless steel, the first and second molded members 16 and 17 can be withdrawn from the simulated blood vessel 78 without the second material 76 being sticking to the mold 10 with no apparent difficulty. The simulated blood vessel 78 obtained in this way is made up of simulated non-lesioned part 80 simulating a non-lesioned part of the blood vessel and provided so as to have a substantially constant inner diameter and a simulated narrowed part 81 located adjacent to the simulated non-lesioned part 80, simulating the narrowed part of the blood vessel and whose inner diameter is set to be smaller than that of the simulated non-lesioned part. Here, the inner wall part of the simulated narrowed part 81 is formed of an inorganic material of any one of calcium phosphate, calcium carbonate, magnesium and sodium, a high polymer material of any one of silicone, latex and polyurethane or a mixed material of the inorganic material and high polymer material, and a narrowed part due to calcification is simulated.

Therefore, according to such an embodiment, the mold 10 can be separated in the axial direction at the center part 14 where the concave 12 has a minimum diameter and it is possible to perform demolding from the hardened simulated blood vessel 78 without breaking the mold 10. Furthermore, the mold 10 separated when demolding is performed can be reunited when the next simulated blood vessel 78 is formed and has the effect that the same mold 10 can be repeatedly used. Furthermore, it is also possible to easily form the simulated blood vessel 78 including the calcified simulated narrowed part 81 which has never been simulated conventionally to hardness approximate to the actual condition and also has the effect that a performance experiment of the stent inserted into the simulated narrowed part 81 can be performed in a condition similar to the actual condition in which the blood vessel lumen is inserted.

When a mixed material of the inorganic material and the high polymer material is used as the first material 75, it is possible to form the simulated narrowed part 81 of a different level of hardness by adjusting the fraction of a mixture of the inorganic material and the high polymer material. Here, a hardness test (Type E) specified in JISK6253 was conducted on the simulated narrowed part 81 by changing the compounding ratio of calcium carbonate and silicone and a result shown in the graph in FIG. 4 was obtained. The result shows that assuming the total of calcium carbonate and silicone is 100%, the content rate of calcium carbonate is substantially proportional to the hardness. Therefore, changing the content rate of calcium carbonate with respect to silicone allows the simulated narrowed part 81 of hardness according to various pathosis to be easily created. The same also applies to the other inorganic material and high polymer material.

Furthermore, a liquid or jellied (e.g., gelatin) material is used as the first material 75, the material is accommodated in a bag or tube or the like without outflows, made to adhere to the concave 12 and the second material 76 is applied to the outer periphery of the mold 10 and hardened as described above and the simulated narrowed part 81 where plaque is simulated is thereby formed.

Furthermore, according to the embodiment, the first and second molded members 16 and 17 can be divided into three portions respectively, but since all the front end member 22, intermediate member 23 and rear end member 24 which are divided portions can be coupled with the other members 22, 23 and 24, by attaching another intermediate member 23 between the front end member 22 and the intermediate member 23 or between the intermediate member 23 and the rear end member 24 and further adding the intermediate member 23 or omitting the intermediate member 23 from the embodiment, it is possible to extend the overall length of the mold 10 with respect to the embodiment. Thus, the length of the simulated blood vessel 78 obtained can be easily changed by changing the number of intermediate members 23 to be coupled, eliminating the necessity of providing a number of whole molds 10 corresponding to the length of the simulated blood vessel 78 and various lengths of simulated blood vessel 78 can be obtained while achieving commonality between the front end member 22 and rear end member 24 by only providing a plurality of intermediate members 23.

Furthermore, by providing a plurality of tapered front parts 27 of different bent shapes and selecting appropriate ones, it is possible to easily change the shape of the concave 12 and create various simulated narrowed parts 81 of different thicknesses and shapes. Therefore, when the simulated narrowed part 81 according to various clinical cases is formed, many types of the whole mold 10 need not be provided and it is possible to form various modes of simulated narrowed part 81 by achieving commonality of the intermediate member 23 and the rear end member 24 and replacing only the front end member 22 as attachment.

Furthermore, it is possible to form such a small gap that no first material 75 penetrates between the front ends 20 and 20 of the first and second molded members 16 and 17, then form the concave 12, cause the first material 75 to adhere to the concave 12 and form the simulated blood vessel 78 using the same procedure as that described above. By so doing, air in the gap enters the first material 75 during heating and bubbles are mixed in substantially the center in the axial direction of the simulated narrowed part 81. The bubbles appear on the outer periphery side of the simulated blood vessel 78 as a mark illustrating a portion of the smallest inner diameter in the simulated blood vessel 78 and can be used as a guideline of the stent indwelling position during a durability evaluation test on the stent or the like.

Furthermore, by applying a high polymer material of any one of silicone, latex and polyurethane to the surface of the concave 12 and applying the first material 75 differing in component from the high polymer material superimposed thereon to fill the concave 12, it is also possible to apply the second material 76 using the same procedure as that described above and form the simulated blood vessel 78. Thus, even in the case where the component of the first material 75 is adjusted so that the inner wall of the simulated narrowed part 81 becomes brittle and calcification is simulated, the high polymer material first applied to the concave 12 prevents sudden collapse of the embrittled inner wall, allowing the brittle calcified state, which is an aspect of the actual lesioned blood vessel, to be simulated and maintained.

In addition, the configuration of the mold 10 according to the present invention is not limited to the illustrated configuration examples, various modifications can be made thereto as long as the minimum diameter portion of the concave 12 is divisible in the axial direction.

DESCRIPTION OF SYMBOLS

10 Mold
12 Concave
13 Straight part
14 Center part
16 First molded member
17 Second molded member
18 Axial member
20 Front end
22 Front end member
23 Intermediate member
24 Rear end member
27 Tapered front part
29 Inner space
40 Inner space
57 Inner space
75 First material
76 Second material
78 Simulated blood vessel
80 Simulated non-lesioned part
81 Simulated narrowed part

The invention claimed is:

1. A bar-shaped mold used to produce a simulated blood vessel, comprising first and second molded members in which inner spaces penetrating in an axial direction are formed respectively and axial members detachably attached to the respective molded members by being inserted into the respective inner spaces,
wherein the first and second molded members are each provided with a narrowed tapered front part, the axial members are attached with front ends of the tapered front parts confronting each other to form a concave and the respective molded members can be separated when the axial members are removed.

2. The mold for producing a simulated blood vessel according to claim 1, wherein the first and/or second molded members are provided so as to be divisible into a plurality of portions in the axial direction and shaped so that each divided portion can be coupled with any one of the other divided portions.

3. A method of producing a simulated blood vessel using a bar-shaped mold comprising a concave recessed in a diameter direction with respect to a neighboring region, the concave being divisible in an axial direction at a minimum diameter portion, the method comprising:
causing a first material to adhere to the concave, then causing a second material to adhere to the entire outer periphery of the mold, dividing the concave after each material is hardened, pulling both ends in the axial direction of the mold to thereby withdraw the mold from each material and obtaining a simulated blood vessel.

4. The method of producing a simulated blood vessel according to claim 3, wherein the first material is an inorganic material of any one of calcium phosphate, calcium carbonate, magnesium and sodium, a high polymer material of any one of silicone, latex and polyurethane or a mixed material of the inorganic material and the high polymer material, the second material is a high polymer material of any one of silicone, latex and polyurethane and a narrowed part of a blood vessel is formed in a simulated manner through calcification.

5. The method of producing a simulated blood vessel according to claim 4, wherein narrowed parts of different levels of hardness are formed for the first material in a simulated manner by adjusting the composition between the inorganic material and the high polymer material.

6. The method of producing a simulated blood vessel according to claim 3, 4 or 5, wherein a high polymer material of any one of silicone, latex and polyurethane is made to adhere to the concave and then the first material is made to adhere thereto.

7. The method of producing a simulated blood vessel according to claim 3, wherein the first material is a liquid or jellied material, the second material is a high polymer material of any one of silicone, latex and polyurethane and a narrowed part of a blood vessel due to plaque is formed in a simulated manner.

8. The method of producing a simulated blood vessel according to claim 3, 4, 5 or 7, wherein a gap is formed in the divided part of the concave, the first material is made to adhere thereto and the first material is heated and hardened.

* * * * *